(12) United States Patent
Viinikanoja et al.

(10) Patent No.: US 8,049,816 B2
(45) Date of Patent: Nov. 1, 2011

(54) MOBILE TERMINAL DEVICE HAVING CAMERA SYSTEM

(75) Inventors: Jarkko Viinikanoja, Tampere (FI); Jukka Yrjänäinen, Ylöiärvi (FI)

(73) Assignee: Nokia Corporation, Espoo (FI)

( * ) Notice: Subject to any disclaimer, the term of this patent is extended or adjusted under 35 U.S.C. 154(b) by 967 days.

(21) Appl. No.: 09/987,849

(22) Filed: Nov. 16, 2001

(65) Prior Publication Data

US 2003/0164895 A1 Sep. 4, 2003

(51) Int. Cl.
H04N 5/225 (2006.01)
H04N 5/232 (2006.01)

(52) U.S. Cl. ............ 348/375; 348/211.2; 348/340; 348/360

(58) Field of Classification Search .......... 348/345, 348/347, 552, 14.01, 231.1; 455/556.1, 557, 455/566, 567, 41
See application file for complete search history.

(56) References Cited

U.S. PATENT DOCUMENTS

| | | | |
|---|---|---|---|
| 5,491,507 A * | 2/1996 | Umezawa et al. ......... 348/14.02 |
| 5,892,624 A | 4/1999 | Klintz et al. |
| 6,081,389 A * | 6/2000 | Takayama et al. ............ 359/680 |
| 6,272,290 B1 * | 8/2001 | Mogamiya ...................... 396/59 |
| 6,292,212 B1 * | 9/2001 | Zigadlo et al. .................. 348/33 |
| 6,295,088 B1 * | 9/2001 | Tsukahara et al. ........ 348/333.06 |
| 6,373,524 B2 * | 4/2002 | Suda et al. ..................... 348/345 |
| 6,490,419 B2 * | 12/2002 | Teramoto ....................... 396/321 |
| 6,690,417 B1 * | 2/2004 | Yoshida et al. ............. 348/231.1 |
| 6,775,361 B1 * | 8/2004 | Arai et al. .................... 379/93.17 |
| 2001/0029167 A1 * | 10/2001 | Takeda et al. .................... 455/41 |
| 2001/0053701 A1 * | 12/2001 | Hattori ........................... 455/550 |
| 2001/0053703 A1 * | 12/2001 | Kobayashi ..................... 455/556 |
| 2002/0077069 A1 * | 6/2002 | Heurtaux ......................... 455/90 |
| 2002/0137542 A1 * | 9/2002 | Masutani et al. ............. 455/556 |
| 2002/0155864 A1 * | 10/2002 | Wang .............................. 455/566 |
| 2003/0181225 A1 * | 9/2003 | Hasegawa et al. ............ 455/566 |

FOREIGN PATENT DOCUMENTS

| | | |
|---|---|---|
| EP | 0 954 150 A2 | 11/1999 |
| EP | 11308590 | 11/1999 |
| JP | 2001-333171 | 11/2001 |
| JP | 2002-271665 | 9/2002 |
| WO | WO 97/26744 | 7/1997 |
| WO | 01/31892 A1 | 5/2001 |
| WO | 02/076067 A1 | 9/2002 |

OTHER PUBLICATIONS

International Search Report in corresponding International Application No. PCT/IB02/03829 dated Jan. 8, 2003.
Notice of Reasons for Rejection issued in related Japanese Patent Application No. 2008-226268 dated Sep. 7, 2010.

* cited by examiner

*Primary Examiner* — Luong T Nguyen
(74) *Attorney, Agent, or Firm* — Banner & Witcoff, Ltd.

(57) ABSTRACT

The present invention is a camera system which is usable with a mobile terminal. The camera system includes a lens module and at least one mechanism for changing optical properties by interacting with the lens module. The camera system may be built into the mobile terminal or attached thereto as an external module.

42 Claims, 6 Drawing Sheets

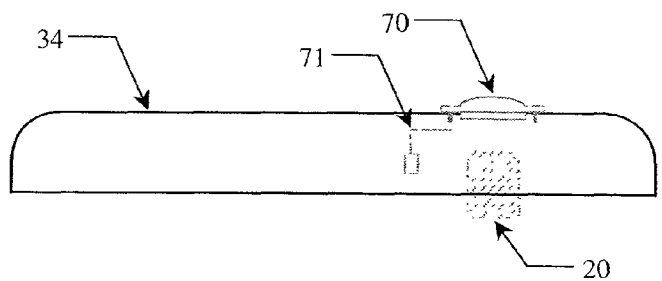
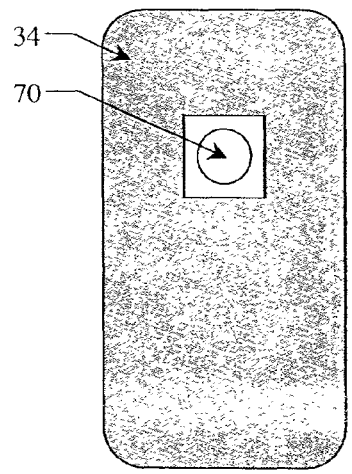
Fig. 3a
(side view)
Fig. 3b
(back view)
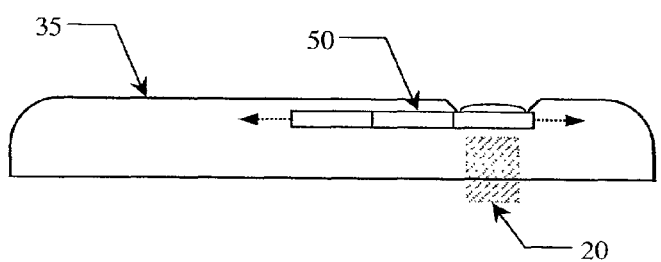
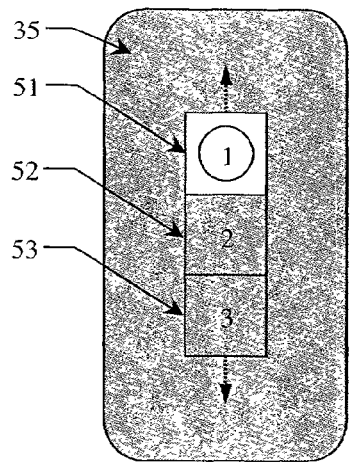
Fig. 4a
(side view)
Fig. 4b
(back view)

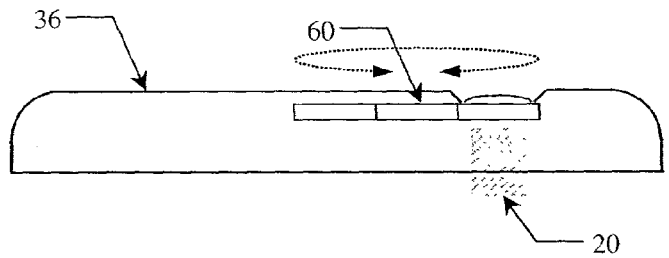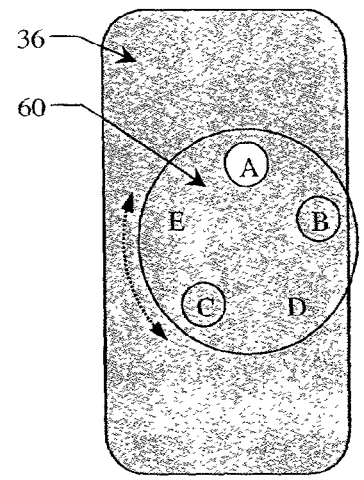
Fig. 5a
(side view)
Fig. 5b
(back view)
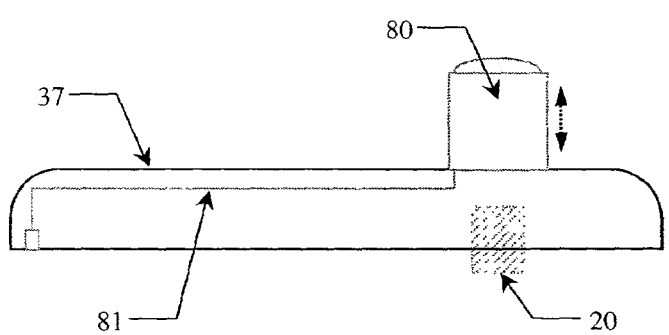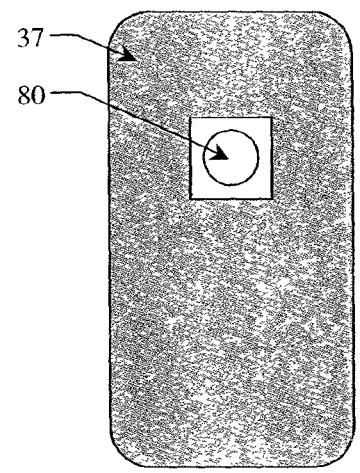
Fig. 6a
(side view)
Fig. 6b
(back view)

MOBILE TERMINAL DEVICE HAVING CAMERA SYSTEM

BACKGROUND OF THE INVENTION

1. Field of the Invention

The present invention relates to a device, method and system for enhancing optical properties of a camera system of a mobile terminal device. Particularly, the invention relates to a device, method and system for enhancing optics of a mobile terminal device having a variable camera system employing a cover that integrates variable lenses.

2. Description of the Prior Art

The second generation mobile phone systems, such as GSM, have significantly increased over the last years. The penetration of mobile phones exceeds 80% in countries with advanced wireless markets. The second generation mobile communication systems are optimized for voice traffic. The coming third generation mobile communication system enables not only the intermediate standards of the second generation mobile communication system but also the handling of high data rate services and will provide for voice traffic as an additional service. Wireless communication will be extended to further services which are limited by the low data rate of the second generation mobile communication systems.

One of the services requiring high data rates will be the possibility to transmit and receive high quality images and videos. The capability of high data rates allows providing this service within acceptable transmission duration and acceptable costs.

Therefore, coming mobile phones will include digital cameras to take pictures which may be transmitted to other participants of the mobile communication system, like friends or colleagues or suitable recipients connected in any way to the mobile communication system. For example, a built-in digital camera will provide the possibility to operate video telephony. The number of applications using built-in digital cameras and also camera modules plugged into a mobile phone are numerous and the possibility of transmitting pictures will improve the performance of communication in an advantageous way. The success of messages according to the short message service (SMS) standard which enables the transmission of simple low resolution pictures may give a hint to the coming success of video and picture transmission with high resolution.

A digital camera built within a mobile phone or provided as an external digital camera module plugged into a mobile phone will fulfil its function although several restrictions have to be imposed on the digital cameras, such as size, weight, power consumption, and the like. Small mobile sized phones of low weight fulfil the demands of the market and the consumer. Accordingly, additional built-in equipment or plugged-on equipment will have to fulfil the same demands to be acceptable by the users.

Preferably, CMOS sensors are used as detector system for digital cameras. The size of charged coupled devices (CCD) allows designing digital cameras of small size and low weight. According to size and weight of mobile devices, the optics of the digital camera system have to be subject to the same restrictions. That means that advanced optics known from prior stand-alone digital cameras can not be used for digital cameras built into mobile terminals. Size and weight of advanced optics will exceed the restrictions. Therefore, the digital cameras are equipped with fixed focus imaging optics which limits the distance for sharp imaging to a imaging distance resulting from the design of the fixed focus imaging optics. Often the imaging is limited from about 50 cm to infinity. Moreover the (horizontal as well as also vertical) field of view is fixed to a pre-defined value.

SUMMARY OF THE INVENTION

Nevertheless, the need of enhanced optics for digital cameras for mobile terminals, especially mobile phones, enabling taking of pictures at short distances or pictures of different fields of view will arise for the user of the camera system and will be solved by the present invention.

The present invention provides a device, a system and a method to overcome the limitations of a fixed focus camera system, especially of camera systems built into mobile phones.

The invention provides a mobile terminal device, particularly a mobile phone, equipped with a camera system comprising a lens module for imaging, and a mechanism for changing optical properties of the lens module to adapt the optical properties of the whole camera system to a user's requirements.

Aspects of the invention relate to a part of a housing, such as front or back cover or part of the respective covers, with integrated mechanism for changing the optical properties of a lens module, wherein the lens module operates a camera system of a camera system of a mobile terminal device. In certain embodiments, the mechanism for changing the optical properties may comprise a lens, objective comprising several lenses, at least one filter, a diffractive optical element, and combinations thereof.

The invention is also a mechanism for changing optical properties of a camera system comprising a lens module and operated as a camera system of a mobile terminal device wherein the mechanism for changing optical properties is integrated into a part of a housing.

The invention is also a method for changing the optical properties of a camera system of a mobile terminal device, wherein optical properties of a lens module of the camera system are changed by using a mechanism for changing optical properties. The mechanism for changing optical properties is integrated into a part of a housing enclosing the camera system of the mobile terminal device.

The invention is also a system comprising a camera system of a mobile terminal device, a part of a housing and a mechanism for changing optical properties of the lens module of the camera system, wherein the mechanism for changing optical properties of the lens module is integrated into a part of the housing.

Overall, the present invention provides the equipping of mobile terminal devices with standard camera systems enabling the user thereof to take pictures. These standard camera systems fulfil the basic requirements of low cost systems of small size and low weight with overall cost efficiency according to the demand of the market segment. The standard camera system provides a kind of standard imaging covering a major part of user's requirement for taking pictures or scenes with a camera system. Further requirements of the lens system of the camera will be met by the mechanism for changing optical properties of the lens module of the camera. The mechanism for changing optical properties may be integrated into the detachably connected housing or part of a housing to be connected to the camera system in case of the user's needs. This optional extension of the camera system provides the possibility to adapt the camera to the respective requirements. The extension is rapidly exchangeable. Moreover, different extensions may be able to adapt to different requirements and the user may be able to decide which size and weight may be acceptable with respect to individual requirements, since advanced optics may not meet the need of size and weight of a standard camera system.

According to a first aspect of the invention, a mobile terminal device is provided. The mobile terminal device has a camera system comprising a lens module, a mechanism for changing optical properties thereof, wherein the mechanism for changing optical properties is adapted to cooperate with the lens module. The lens module operates as a standard imaging optics to reproduce images detected by a detector system included in the camera system. Preferably, the camera system comprises a charged coupled device (CCD) for reproducing images which are focused by the lens module on the CCD. Typically, the lens module may be a fixed focus objective permanently integrated in the camera system of the mobile terminal device. Conveniently, fixed focus objectives have a limited distance range for focusing images, that is from a minimal distance up to infinity, for example 50 cm to infinity. Moreover, further properties like horizontal and vertical field of view (HFOV or VFOV, respectively) underlie the same restrictions. The mechanism for changing optical properties of the lens module may enable modifying the limited properties of the lens module, for example to shorter minimal distance or varying field of view.

Preferably, the mechanism for changing optical properties may be connected detachably to mobile terminal devices or camera systems, respectively. A detachable connection may employ a different mechanism for changing optical properties according to the current requirements for taking pictures. This detachable connection may be a special snap-in connection which receives and supports the mechanism for changing optical properties in an appropriate way. The snap-in connection may provide additional connections, particularly an electrical connection to the electronics of the camera system. The electrical connection may comprise signal connection for controlling signals and also power supply connection.

Conveniently, a part of a housing enclosing the camera system may comprise the mechanism for changing optical properties. A part of a housing may be a front cover or a back cover. Moreover, a part of the housing may also be a part of the front cover or a part of the back cover. The mechanism for changing optical properties may be fixed to the part of the housing but also detachably connected to the part of the housing. The part of the housing may additionally comprise connections, particularly an electrical connection, to the electronics of the camera system. The electrical connection may comprise a signal connection for controlling signals and also power supply connection.

Additionally, the part of a housing comprising the mechanism for changing optical properties may be detachably connected. An exchange of different mechanisms for changing optical properties may be performed by exchanging the part of the housing comprising the respective mechanisms for changing optical properties.

Preferably, the part of a housing comprises not only a mechanism for changing optical properties but an assembly of a plurality of mechanisms for changing optical properties of different characteristics. The assembly comprised by the part of the housing may be changed upon actuation in order to enable the co-operating of the different mechanisms for changing optical properties with the lens module of the camera system. The assembly may also comprise additional elements like a simple protecting cover for the lens module or a simple plane of glass protecting the lens module during without modifying its optical properties.

Conveniently, the actuation of the assembly may be a manual actuation or a motorized actuation or any other electrically controlled actuation, for example of an assembly of variable lenses, by which at least one of the lenses is put into an operative position. In order to control electrically the mechanisms for changing optical properties, additional electrical connections may be provided which connect the electronics of the camera system to the mechanism for changing optical properties. Moreover, the electrical connections may comprise a power supply connection for motorized functions of the mechanism for changing optical properties.

Additionally, the actuation may be a sliding actuation. The assembly of the mechanisms for changing optical properties may be arranged straight in a row, for example, by a row of adjacent optical lenses which may be interchanged so that at least one of the lenses is put into an operative position at a time. The different mechanism for changing optical properties may be suitably arranged with the camera system and the lens module thereof by sliding the whole assembly along a corresponding supporting guide.

Further, the actuation may be a rotating actuation with the assembly being arranged on a wheel. Correspondingly, the different mechanisms for changing optical properties may be suitably arranged with the camera system and the lens module thereof by rotating the wheel around an axis of the wheel, for example, rotating the wheel having a plurality of circumferentially mounted lenses in its periphery along the circumference.

Further, it may be advantageous to connect detachably the assembly of the plurality of mechanism for changing optical properties. A fast and easy exchange of the assembly may increase the possibility of usage. In case of the arrangement of the mechanisms for changing optical properties onto different wheels may be provided. For example, a wheel carrying macro and close-up lenses of different imaging ratios, or a wheel carrying far-distance or telephoto lenses of different magnifications. The number of assemblies and the arrangement of different mechanisms for changing optical properties is not limited.

Preferably, the mechanisms for changing optical properties of the lens system of the camera system of the mobile terminal device may be at least one lens. Lenses set in front of a lens module of a camera system enable changing of optical properties of the lens module, like focus length, field of view, magnification or minimal imaging distance. The manufacturing of the lenses may be based on different lens materials. Common materials are polymers or different glass substrates but the materials for the lenses is not limited to the commonly used ones.

Conveniently, at least one lens may be a macro lens. Usually, the term macro describes an approximately 1:1 (object size to image size) reproduction of an object by an camera system on an imaging plane. Correspondingly, the magnification of the imaged object is 1 or higher.

Additionally, lenses providing a magnification of the imaged object higher than approximately 2 are termed as close-up lenses which means that the object size to image size of the object is 1:2 or smaller. Such a lens may also be provided as a mechanism for changing optical properties of the lens module of the camera system.

Moreover, at least one lens may be a far-distance lens providing to possibility to image objects at a far distance.

Preferably, the mechanism for changing optical properties may comprise a wide converter or more extremely a fisheye lens.

Further preferably, at least one lens may be an electrically variable lens. For example, electrical lenses may provide the possibility to modify their focal length by applying different voltages. The modification of the optical properties of lenses may be preferable since mechanical comparable solutions involving several lenses show many disadvantages like intricate mechanics of a relative high weight.

All the aforementioned mechanisms for changing optical properties may be designed of single lenses but may be also designed of several lenses wherein an adapted combination of lenses provides respective optical properties.

Conveniently, the mechanism for changing optical properties may include the usage of an objective usually built-up of several lenses. The objective may be a zoom objective providing a selective range of the field of view. Usually, field of view may be selected out of the provided range of the field of view by a user operation actuated manually of electrically, for example by a motorized adjustment of the field of view.

Moreover, the objective may be a telephoto objective comprising several lenses and providing telephoto photography. The telephoto objective may be designed as a zoom telephoto objective providing telephotography at different magnifications.

Additionally, the mechanism for changing optical properties may include the usage of an auto-focusing objective usually built-up of several lenses. Objectives comprising several lenses to provide the desired optical properties require often a focusing of the imaged object onto the image plane. The focusing may be motorized actuated or actuated by a comparable controllable mechanism. The automatic actuation of the focusing of objective comprising several lenses may be a preferred solution.

Conveniently, the mechanism for changing optical properties may comprise filters. The employment of filters is well known in photography. Different filters may improve pictures taken by camera systems. For example, a skylight filter reduces the part of blue color of the sky on bright days and reduces the part which is in ultraviolet (UV) light or polarization filters may enable to reduce reflection and produce brighter colors. Also colored filters may improve pictures taken by camera systems of produce special effects.

Preferably, the camera system is built in the mobile terminal device. The mobile terminal device and the camera system comprising the lens module are enclosed by the same housing. The mechanism for changing optical properties of the camera system may be integrated in the housing of the mobile terminal device comprising the camera system. The part of a housing may be a part of the housing of the mobile terminal device including the camera system.

Additionally, the camera system comprising the lens module may be a separate external module which may be plugged into the mobile terminal device for operation of the camera system. The camera system is enclosed by its own housing. The mechanism for changing optical properties of the camera system may be integrated into the housing of the external module comprising the camera system. The part of a housing may be a part of the housing of the external module including the camera system Conveniently, the mobile terminal device may be a mobile phone according to known standards of mobile communication, such as the global system for mobile communication (GSM), universal mobile telecommunication services (UMTS), digital communication system (DCS), wideband code division multiple access (WCDMA), IS-136 (mainly US wireless communication standard), IS-95 (mainly US wireless communication standard) or the like.

According to a second aspect of the invention, a part of a housing comprising a mechanism for changing optical properties is provided. The means for changing optical properties is adapted to cooperate with a lens module of a camera system. A mobile terminal device comprises the camera system.

The lens module operates as a standard imaging optics of the camera system. Preferably, the camera system may be a digital camera system comprising a CCD chip for detecting the images. The lens module focuses the images on the CCD chip. Typically, the lens module may be a fixed focus objective permanently integrated in the camera system which is comprised by the mobile terminal device. Conveniently, fixed focus objectives have a limited distance range for focusing images, that is from a minimal distance up to infinity, for example from 50 cm to infinity. Moreover, further properties like horizontal and vertical field of view (HFOV or VFOV, respectively) underlie the same restrictions. The mechanism for changing optical properties of the lens module may be able to modify the limited properties of the lens module, for example to shorter minimal distance or varying field of view.

Preferably, the mechanism for changing optical properties may be connected detachably to mobile terminal device or camera system, respectively. A detachable connection may allow employment of different mechanisms for changing optical properties according to the current requirements for taking pictures. This detachable connection may be a special snap-in connection which receives and supports the mechanism for changing optical properties in an appropriate way. The snap-in connection may provide additional connections, particularly an electrical connection to the electronics of the camera system. The electrical connection may comprise signal connection for controlling signals and also power supply connection.

Additionally, the part of a housing comprising the mechanism for changing optical properties may be detachably connected. An exchange of different mechanisms for changing optical properties may be performed by exchanging the part of the housing comprising the respective mechanism for changing optical properties. The part of the housing may additionally comprise connections, particularly an electrical connection to the electronics of the camera system. The electrical connection may comprise a signal connection for controlling signals and also a power supply connection.

Preferably, the part of a housing comprises not only a mechanism for changing optical properties but an assembly of a plurality of mechanisms for changing optical properties of different characteristics. The assembly comprised by the part of the housing may be changed upon actuation in order to enable the co-operating of the different mechanisms for changing optical properties with the lens module of the camera system. The assembly may also comprise additional elements like a simple protecting cover for the lens module or a simple plane of glass protecting the lens module during without modifying its optical properties.

Conveniently, the actuation of the assembly may be a manual actuation or a motorized actuation or any other electrically controlled actuation. In order to control electrically the mechanism for changing optical properties, additional electrical connections may be provided which connect the electronics of the camera system to the mechanism for changing optical properties. Moreover, the electrical connections may comprise a power supply connection for motorized functions of the mechanism for changing optical properties.

Additionally, the actuation may be a sliding actuation. The assembly of mechanism for changing optical properties may be arranged straight in a row. The different mechanisms for changing optical properties may be suitably arranged with the camera system and the lens module thereof by sliding the whole assembly along a corresponding supporting guide.

Further, the actuation may be a rotating actuation with the assembly arranged on a wheel. Correspondingly, the different mechanism for changing optical properties may be suitably arranged with the camera system and the lens module thereof by rotating the wheel around an axis of the wheel.

Further, it may be advantageous to connect detachably the assembly of the plurality of mechanisms for changing optical properties. A fast and easy exchange of the assembly may increase the possibility of usage. In case of the arrangement of the mechanisms for changing optical properties onto a wheel, different wheels may be provided. For example, a wheel carrying macro and close-up lenses of different imaging ratios, or a wheel carrying far-distance or telephoto lenses of different magnifications. The number of assemblies and the arrangement of different means for changing optical properties is not limited.

Preferably, the mechanism for changing optical properties of the lens system of the camera system of the mobile terminal device may be at least one lens. Lenses set in front of a lens module of a camera system enable changing of optical properties of the lens module, like focus length, field of view, magnification or minimal imaging distance. The manufacturing of the lenses may be based on different lens materials. Common materials are polymers or different glass substrates but the materials for the lenses is not limited to the commonly used ones.

Conveniently, at least one lens may be a macro lens. Usually, the term macro describes an approximately 1:1 (object size to image size) reproduction of an object by an camera system on an imaging plane. Correspondingly, the magnification of the imaged object is 1 or higher.

Additionally, lenses providing a magnification of the imaged object higher than approximately 2 are termed as close-up lenses which means that the object size to image size of the object is 1:2 or smaller. Such a lens may also be provided as a means for changing optical properties of the lens module of the camera system.

Moreover, at least one lens may be a far-distance lens providing to possibility to image objects at a far distance.

Preferably, the mechanism for changing optical properties may comprise a wide converter or more extremely a fisheye lens.

Further preferably, at least one lens may be an electrically activated lens. For example, electrical lenses may provide the possibility to modify their focal length by applying different voltages. The modification of the optical properties of lenses may be preferable since mechanical comparable solutions involving several lenses show many disadvantages like intricate mechanics of a relative high weight.

All the aforementioned means for changing optical properties may be designed of single lenses but may be also designed of several lenses wherein an adapted combination of lenses provides respective optical properties.

Conveniently, the mechanism for changing optical properties may include the usage of an objective usually built-up of several lenses. The objective may be a zoom objective providing a selective range of the field of view. Usually, a field of view may be selected out of the provided range of the field of view by a user operation actuated manually of electrically, for example by a motorized adjustment of the field of view.

Moreover, the objective may be a telephoto objective comprising several lenses and providing telephoto photography. The telephoto objective may be designed as a zoom telephoto objective providing telephotography at different magnifications.

Additionally, the mechanism for changing optical properties may include the usage of an auto-focusing objective usually built-up of several lenses. Objectives comprising several lenses to provide the desired optical properties require often a focusing of the imaged object onto the image plane. The focusing may be motorized actuated or actuated by comparable controllable means. The automatic actuation of the focusing of objective comprising several lenses may be a preferred solution.

Conveniently, the mechanism for changing optical properties may comprise filters. The employment of filters is well known in photography. Different filters may improve pictures taken by camera systems. For example, a skylight filter reduces the part of blue color from the sky on bright days and reduces ultraviolet (UV) light or polarization filters may enable reduction of reflection and produce brighter colors. Also colored filters may improve pictures taken by camera systems of produce special effects.

Preferably, the camera system is built in the mobile terminal device. The mobile terminal device and the camera system comprising the lens module are enclosed by the same housing. The mechanism for changing optical properties of the camera system may be integrated in the housing of the mobile terminal device comprising the camera system. The part of a housing may be a part of the housing of the mobile terminal device including the camera system.

Additionally, the camera system comprising the lens module may be a separate external module which may be plugged to the mobile terminal device for operation of the camera system. The camera system is enclosed by its own housing. The mechanism for changing optical properties of the camera system may be integrated into the housing of the external module comprising the camera system. The part of a housing may be a part of the housing of the external module including the camera system.

Conveniently, the mobile terminal device may be a mobile phone according to the known standards of mobile communication, such as global system for mobile communication (GSM), universal mobile telecommunication services (UMTS), digital communication system (DCS), wideband code division multiple access (WCDMA), IS-136 (mainly US wireless communication standard), IS-95 (mainly US wireless communication standard) or the like.

According to third aspect of the invention, the mechanism for changing optical properties are provided. The mechanisms for changing optical properties are adapted to cooperate with a lens module of a camera system. A mobile terminal device comprises the camera system. The lens module operates as a standard imaging optics of the camera system. Preferably, the camera system may be a digital camera system comprising a CCD chip for detecting the images. The lens module focuses the images on the CCD chip. Typically, the lens module may be a fixed focus objective permanently integrated in the camera system which is comprised by the mobile terminal device. Conveniently, fixed focus objectives have a limited distance range for focusing images, that is from a minimal distance up to infinity, for example from 50 cm to infinity. Moreover, further properties like horizontal and vertical field of view (HFOV or VFOV, respectively) underlie the same restrictions. The mechanism for changing optical properties of the lens module may enable modifying the limited properties of the lens module, for example to shorter minimal distance or varying field of view.

Preferably, the mechanism for changing optical properties may be connected detachably to mobile terminal device or camera system, respectively. A detachable connection may allow employment of different mechanisms for changing optical properties according to the current requirements for taking images. This detachable connection may be a special snap-in connection which receives and supports the mechanism for changing optical properties in an appropriate way. The snap-in connection may provide additional connections, particularly an electrical connection to the electronics of the camera system. The electrical connection may comprise signal connection for controlling signals and also power supply connection.

Conveniently, a part of a housing enclosing the camera system may comprise the mechanisms for changing optical properties. A part of a housing may be a front cover or a back cover. Moreover, a part of the housing may also be a part of the front cover or a part of the back cover. The mechanism for changing optical properties may be fixed to the part of the housing but also detachably connected to the part of the housing. The part of the housing may additionally comprise connections, particularly an electrical connection to the electronics of the camera system. The electrical connection may comprise signal connection for controlling signals and also power supply connection.

Additionally, the part of a housing comprising the mechanism for changing optical properties may be detachably connected. An exchange of different mechanism for changing optical properties may be performed by exchanging the part of the housing comprising the respective means for changing optical properties.

Preferably, the mechanism for changing optical properties of the lens system of the camera system of the mobile terminal device may be at least one lens. Lenses set in front of a lens module of a camera system enable changing of optical properties of the lens module, like focal length, field of view, magnification or minimal imaging distance. The manufacturing of the lenses may be based on different lens materials. Common materials are polymers or different glass substrates but the materials for the lenses is not limited to the commonly used ones.

Conveniently, at least one lens may be a macro lens. Usually, the term macro describes an approximately 1:1 (object size to image size) reproduction of an object by an camera system on an imaging plane. Correspondingly, the magnification of the imaged object is 1 or higher.

Additionally, lenses providing a magnification of the imaged object higher than approximately 2 are termed as close-up lenses which means that the object size to image size of the object is 1:2 or smaller. Such a lens may also be provided as a mechanism for changing optical properties of the lens module of the camera system.

Moreover, at least one lens may be a far-distance lens providing to possibility to image objects at a far distance.

Preferably, the mechanism for changing optical properties may comprise a wide converter or more extremely a fisheye lens.

Further preferably, at least one lens may be an electrically activated lens. For example, electrical lenses may provide the possibility to modify their focal length by applying different voltages. The modification of the optical properties of lenses may be preferable since mechanical comparable solutions involving several lenses show many disadvantages like intricate mechanics of a relative high weight.

All the aforementioned mechanisms for changing optical properties may be designed of single lenses but may be also designed of several lenses wherein an adapted combination of lenses provides respective optical properties.

Conveniently, the mechanism for changing optical properties may include the usage of an objective usually built-up of several lenses. The objective may be a zoom objective providing a selective range of the field of view. Usually, field of view may be selected out of the provided range of the field of view by a user operation actuated manually of electrically, for example by a motorized adjustment of the field of view.

Moreover, the objective may be a telephoto objective comprising several lenses and providing telephoto photography. The telephoto objective may be designed as a zoom telephoto objective providing telephotography at different magnifications.

Additionally, the mechanism for changing optical properties may include the usage of an auto-focusing objective usually built-up of several lenses. Objectives comprising several lenses to provide the desired optical properties require often a focusing of the imaged object onto the image plane. The focusing may be motorized actuated or actuated by comparable controllable means. The automatic actuation of the focusing of objective comprising several lenses may be a preferred solution.

Conveniently, the mechanism for changing optical properties may comprise filters. The employment of filters is well known in photography. Different filters may improve pictures taken by camera systems. For example, a skylight filter reduces blue color from the sky on bright days and reduces ultraviolet (UV) light or polarization filters may enable reduction of reflection and produce brightercolors. Also colored filters may improve pictures taken by camera systems of produce special effects.

Preferably, the camera system is built in the mobile terminal device. The mobile terminal device and the camera system comprising the lens module are enclosed by the same housing. The mechanism for changing optical properties of the camera system may be integrated in the housing of the mobile terminal device comprising the camera system. The part of a housing may be a part of the housing of the mobile terminal device including the camera system.

Additionally, the camera system comprising the lens module may be a separate external module which may be plugged to the mobile terminal device for operation of the camera system. The camera system is enclosed by its own housing. The mechanism for changing optical properties of the camera system may be integrated into the housing of the external module comprising the camera system. The part of a housing may be a part of the housing of the external module including the camera system.

Conveniently, the mobile terminal device may be a mobile phone according to known standards of mobile communication, such as the global system for mobile communication (GSM), universal mobile telecommunication services (UMTS), digital communication system (DCS), wideband code division multiple access (WCDMA), IS-136 (mainly US wireless communication standard), IS-95 (mainly US wireless communication standard) or the like.

According to a fourth aspect of the invention, a method for changing optical properties of a lens module of a camera system is provided. The mechanism for changing optical properties are placed in front of the lens module of the camera system within the optical trace. A mobile terminal device comprises the camera system. The lens module operates as a standard imaging optics of the camera system. Preferably, the camera system may be a digital camera system comprising a CCD chip for detecting the images. The lens module focuses the images on the CCD chip. Typically, the lens module may be a fixed focus objective permanently integrated in the camera system which is comprised by the mobile terminal device. Conveniently, fixed focus objectives have a limited distance range for focusing images, that is from a minimal distance up to infinity, for example from 50 cm to infinity. Moreover, further properties like horizontal and vertical field of view (HFOV or VFOV, respectively) underlie the same restrictions. The mechanism for changing optical properties of the lens module may enable modification of the limited properties of the lens module, for example to shorter minimal distance or varying field of view. Therefore, the mechanism for changing the optical properties are adapted to cooperate with the lens module. By placing the mechanisms for changing optical properties in front of the lens module the optical properties are modified in a desired way enabling extending and enhancing the imaging of the camera system.

Preferably, the mechanism for changing optical properties may be connected detachably to mobile terminal device or camera system, respectively. A detachable connection may allow employing different mechanisms for changing optical properties according to the current requirements for taking pictures. This detachable connection may be a special snap-in connection which receives and supports the means for changing optical properties in an appropriate way. The snap-in connection may provide additional connections, particularly an electrical connection to the electronics of the camera system. The electrical connection may comprise signal connection for controlling signals and also a power supply connection.

Conveniently, a part of a housing enclosing the camera system may comprise the mechanism for changing optical properties. A part of a housing may be a front cover or a back cover. Moreover, a part of the housing may also be a part of the front cover or a part of the back cover. The mechanism for changing optical properties may be connected detachably to the part of the housing. The part of the housing may additionally comprise connections, particularly an electrical connection to the electronics of the camera system. The electrical connection may comprise a signal connection for controlling signals and also a power supply connection.

Additionally, the part of a housing may integrate the mechanism for changing optical properties. Conveniently, an electrical connection may also be integrated providing connection to the electronics of the camera system.

Preferably, the part of a housing comprising the mechanism for changing optical properties may be detachably connected. An exchange of different mechanism for changing optical properties may be performed by exchanging the part of the housing comprising the respective mechanisms for changing optical properties.

Preferably, the part of a housing comprises not only a mechanism for changing optical properties but also an assembly of a plurality of mechanisms for changing optical properties of different characteristics. The assembly comprised by the part of the housing may be changed upon actuation in order to enable the co-operating of the different mechanisms for changing optical properties with the lens module of the camera system. The assembly may also comprise additional elements like a simple protecting cover for the lens module or a simple plane of glass protecting the lens module during without modifying its optical properties.

Conveniently, the actuation of the assembly may be a manual actuation or a motorized actuation or any other electrically controlled actuation. In order to control electrically the mechanism for changing optical properties, additional electrical connections may be provided which connect the electronics of the camera system to the means for changing optical properties. Moreover, the electrical connections may comprise a power supply connection for motorized functions of the means for changing optical properties.

Additionally, the actuation may be a sliding actuation. The assembly of mechanisms for changing optical properties may be arranged straight in a row. The different mechanisms for changing optical properties may be suitably arranged with the camera system and the lens module thereof by sliding the whole assembly along a corresponding supporting guide.

Further, the actuation may be a rotating actuation with the assembly arranged on a wheel. Correspondingly, the different mechanisms for changing optical properties may be suitably arranged with the camera system and the lens module thereof by rotating the wheel around an axis of the wheel.

Further, it may be advantageous to connect detachably the assembly of the plurality of mechanisms for changing optical properties. A fast and easy exchange of the assembly may increase the possibility of usage. In case of the arrangement of the mechanisms for changing optical properties onto a wheel, different wheels may be provided. For example, a wheel carrying macro and close-up lenses of different imaging ratios, or a wheel carrying far-distance or telephoto lenses of different magnifications may be used. The number of assemblies and the arrangement of different mechanisms for changing optical properties is not limited.

Preferably, the mechanism for changing optical properties of the lens system of the camera system of the mobile terminal device may be at least one lens. Lenses set in front of a lens module of a camera system enable changing of optical properties of the lens module, like focal length, field of view, magnification or minimal imaging distance. The manufacturing of the lenses may be based on different lens materials. Common materials are polymers or different glass substrates but the materials for the lenses is not limited to the commonly used ones.

Conveniently, at least one lens may be a macro lens. Usually, the term macro describes an approximately 1:1 (object size to image size) reproduction of an object by an camera system on an imaging plane. Correspondingly, the magnification of the imaged object is 1 or higher.

Additionally, lenses providing a magnification of the imaged object higher than approximately 2 are termed as close-up lenses which means that the object size to image size of the object is 1:2 or smaller. Such a lens may also be provided as a mechanism for changing optical properties of the lens module of the camera system.

Moreover, at least one lens may be a far-distance lens providing the possibility to image objects at a far distance.

Preferably, the mechanism for changing optical properties may comprise a wide converter or more extremely a fisheye lens.

Further preferably, at least one lens may be an electrical lens. For example, electrical lenses may provide the possibility to modify their focal length by applying different voltages. The modification of the optical properties of lenses may be preferable since mechanical comparable solutions involving several lenses show many disadvantages like intricate mechanics of a relative high weight.

All the aforementioned mechanisms for changing optical properties may be designed of single lenses but may be also designed of several lenses wherein an adapted combination of lenses provides respective optical properties.

Conveniently, the mechanism for changing optical properties may include the usage of an objective usually built-up of several lenses. The objective may be a zoom objective providing a selective range of the field of view. Usually, a field of view may be selected out of the provided range of the field of view by a user operation actuated manually of electrically, for example by a motorized adjustment of the field of view.

Moreover, the objective may be a telephoto objective comprising several lenses and providing telephoto photography. The telephoto objective may be designed as a zoom telephoto objective providing telephotography at different magnifications.

Additionally, the mechanism for changing optical properties may include the usage of an auto-focusing objective usually built-up of several lenses. Objectives comprising several lenses to provide the desired optical properties require often a focusing of the imaged object onto the image plane. The focusing may be motorized actuated or actuated by comparable controllable means. The automatic actuation of the focusing of objective comprising several lenses may be a preferred solution.

Conveniently, the mechanism for changing optical properties may comprise filters. The employment of filters is well known in photography. Different filters may improve pictures taken by camera systems. For example, a skylight filter reduces blue color from the sky on bright days and reduces ultraviolet (UV) light or polarization filters may enable reducing reflection and produce brighter colors. Also colored filters may improve pictures taken by camera systems of produce special effects.

Preferably, the camera system is built in the mobile terminal device. The mobile terminal device and the camera system comprising the lens module are enclosed by the same housing. The mechanism for changing optical properties of the camera system may be integrated in the housing of the mobile terminal device comprising the camera system. The part of a housing may be a part of the housing of the mobile terminal device including the camera system.

Additionally, the camera system comprising the lens module may be a separate external module which may be plugged to the mobile terminal device for operation of the camera system. The camera system is enclosed by its own housing. The mechanism for changing optical properties of the camera system may be integrated in the housing of the external module comprising the camera system. The part of a housing may be a part of the housing of the external module including the camera system.

Conveniently, the mobile terminal device may be a mobile phone according to the known standards of mobile communication, such as global system for mobile communication (GSM), universal mobile telecommunication services (UMTS), digital communication system (DCS), wideband code division multiple access (WCDMA), IS-136 (mainly US wireless communication standard), IS-95 (mainly US wireless communication standard) or the like.

According to a fifth aspect of the invention, a system for changing optical properties of a lens module of a camera system is provided. The system comprises a mobile terminal module which comprises the camera system and a mechanism for changing optical properties which are adapted to cooperate with the lens module of the camera system. The lens module operates as a standard imaging optics of the camera system. Preferably, the camera system may be a digital camera system comprising a CCD chip for detecting the images. The lens module focuses the images on the CCD chip. Typically, the lens module may be a fixed focus objective permanently integrated in the camera system which is comprised by the mobile terminal device. Conveniently, fixed focus objectives have a limited distance range for focusing images, that is from a minimal distance up to infinity, for example from 50 cm to infinity. Moreover, further properties like horizontal and vertical field of view (HFOV or VFOV, respectively) underlie the same restrictions. The mechanism for changing optical properties of the lens module may enable modification of the limited properties of the lens module, for example to shorter minimal distance or varying field of view. Therefore, the mechanism for changing the optical properties are adapted to cooperate with the lens module. By placing the mechanism for changing optical properties in front of the lens module, the optical properties are modified in a desired way enabling to extend and enhance the imaging of the camera system.

The mobile terminal device is a mobile terminal device according to the aforementioned aspect of a mobile terminal device with respect to an embodiment of this invention.

BRIEF DESCRIPTION OF THE DRAWINGS

The accompanying drawings are included to provide a further understanding of the invention and are incorporated in and constituted a part of this specification. The drawings illustrate embodiments of the invention and, together with the description, serve to explain the principles of the invention. In the drawings:

FIG. 3a shows a side view of a cover with integrated detachably connected lens according to a further embodiment of the invention;

FIG. 3b shows a back view of a cover with an integrated detachably connected lens according to FIG. 3a;

FIG. 4a shows a side view of a cover with an integrated sliding arrangement of several lenses with respect to a further embodiment of the invention;

FIG. 4b shows a back view of a cover with integrated sliding arrangement of several lenses with respect to FIG. 4a;

FIG. 5a shows a side view of a cover with an integrated revolving arrangement of several lenses according to a further embodiment of the invention;

FIG. 5b shows a back view of a cover with an integrated revolving arrangement of several lenses according to FIG. 5a;

FIG. 6a shows a side view of a cover with an integrated advanced optics with respect to a further embodiment of the invention;

FIG. 6b shows a back view of a cover with an integrated advanced optics with respect to FIG. 6a.

In the figures corresponding reference numerals denote corresponding features.

DESCRIPTION OF THE PREFERRED EMBODIMENTS

A mobile terminal device, such as a mobile phone, integrates a digital camera system which is built up of a detector system, commonly a CCD chip and a camera system, commonly a arrangement of lenses. The usage of a CCD chip for imaging may involve additionally an infrared (IR) filter to avoid damaging of the CCD chip. For the ability to take pictures in a visible region an IR filter is needed, otherwise the IR light will saturate the sensor. This set-up enables taking of pictures. Moreover, an arrangement of a CCD chip and lens module enables designing small sized camera modules of low weight.

Figure 1:
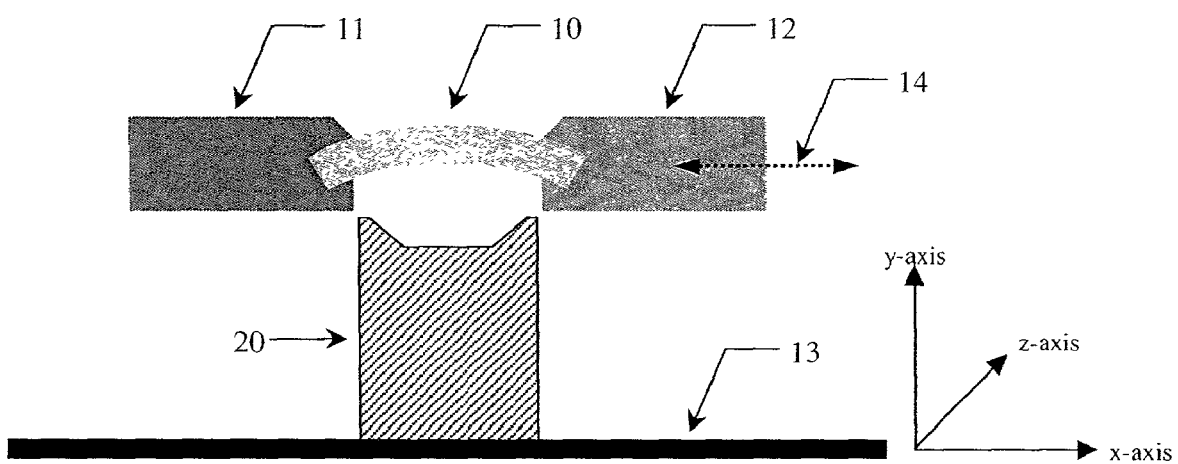
FIG. 1 shows an arrangement of an integrated digital camera module and an optical assembly according to an embodiment of the invention.

In certain embodiments, an optical properties changing unit may comprise a lens, objective comprising several lenses, at least one filter, a diffractive optical element, and combinations thereof. FIG. 1 shows an arrangement of an integrated digital camera module and an optical assembly according to an embodiment of the invention. The camera module 20 may be arranged directly on a printed wired board 13 and connected to the mobile terminal device (not shown). The camera module including the lens module for imaging and an IR filter may be designed small enough in order to be mounted as a camera unit 20 coupled to the printed wired board 13. According to various embodiments disclosed herein, an optical properties changing unit may comprise element 10, shown in FIG. 1.

An arrangement of lens 10 for changing optical properties, glass cover 12 or hard coated plastic cover and hard cover 11 is placed in front of the opening of the lens module of the camera unit 20. The lens 10 is adapted to the optic properties of the camera unit 20 to act, for example, as a close-up lens, a macro lens, a far-distance lens or the like. If the original optical design of the lens module of the camera unit 20 are known, lenses for changing optical properties of the lens module can be easily designed for and adapted to the camera system.

The lens 10, glass cover 12 and hard cover 11 may be arranged as an assembly which may be actuated along an axis indicated by arrow 14. A movement of the assembly enables arrangement of the different elements of the assembly in front of the opening of the camera unit 20. The glass cover 12 is used for taking pictures with unmodified imaging properties, that is according to the optical imaging properties of the lens module included in the camera unit 20. The hard cover 11 may be used to protect the lens module of the camera unit 20 if the camera unit 20 is not used. Especially low cost and low weight polymer lenses are highly sensitive to scratches. A glass cover 12 and a hard cover 11 may be a preferred method to protect the outer surface of the lens module.

In case of placing lens 10 in front of the camera unit 20, the optical imaging properties are changed according to the respective design of the lens 10. A plurality of lenses or assembly of several lenses may be adapted to the camera unit 20. Lenses may be designed for enabling macro imaging, close-up imaging, far-distance imaging. Of course not only single lenses, like shown in FIG. 1, may be combined with a camera unit 20. Also zoom objectives or auto-focus objectives may be adapted to the lens module of camera unit 20 and provide extended changing of optical properties of the camera unit 20. It is also possible to include additional power and control lines which provide power and control signals to the lenses or objectives. Control signals may be advantageous for auto-focus and/or zoom objectives since the actuation of such objectives may be automatically operated, for example using a motorised actuation.

The advantage of auxiliary lenses employed in combination with a standard camera unit 20 may be presented in the following table. The table shows object dimensions which may be imaged by auxiliary lenses of adapted focus length. The presented values are based on the specifications of a standard lens module with fixed focus optics and a sharp focus in the range from 50 cm to infinity, a CCD chip resolution of 800×600 pixels (VGA: video graphic adapter) and a horizontal field of view (HFOV) of 55°. A certain close-up length which focal length is adapted to each imaging distance may be used for the imaging of the respective object.

| Distance [mm] | Width [mm] | Height [mm] |
|---|---|---|
| 1000 | 1041 | 780 |
| 500 | 521 | 390 |
| 150 | 156 | 117 |
| 20 | 52 | 39 |

Therefore, a postcard can be photographed at a distance of approximately 150 mm which means that a close-up lens with a focal length of 150 mm is suitable to take a picture of a postcard.

Preferably, the assembly of lens 10, and covers 11 and 12 may be integrated in the overall housing (not shown) of the camera module 20. A suitable guide, in this case a supporting guide, mounted to the housing would enable the movement of the assembly according to the axis 14.

The optical quality of the arrangement of camera unit 20 and lens 10 has to be preserved in order to provide an adequate quality of the pictures taken with the additional lens. As an example, the modulation transfer function (MTF), distortion and relative illumination of a standard lens module and an adapted 150 mm close-up lens may be presented. The standard lens module is designed for imaging on a CCD chip providing a VGA (video graphic adapter) resolution of 800×600 pixels. Further, the standard lens module is based on a fixed focus optics with a sharp focus in the range of 50 cm to infinity.

|  | Standard Lens Module | | | Close-up Lens | | | Close-up Lens (de-center 0.5 tilt) | | |
|---|---|---|---|---|---|---|---|---|---|
| FOV | 0° | 13° | 27° | 0° | 13° | 27° | 0° | 13° | 27° |
| 25 lp/mm | 86% | 82% | 79% | 88% | 84% | 81% | 87% | 83% | 80% |
| 50 lp/mm | 65% | 54% | 52% | 68% | 58% | 52% | 68% | 57% | 51% |
| distortion | 1.2% | | | 1.8% | | | 1.8% | | |
| relative illumination | 57% | | | 54% | | | 54% | | |

The modulation transfer function is analyzed in view of two values: 25 line pairs per millimeter (lp/mm) and 50 line pairs per millimeter (lp/mm). Further, three different values of the field of view (FOV) are examined. Comparing the performance of the standard lens module and the combination of standard lens module and close-up lens for imaging, the values obtained for the modulation transfer function (MTF) are substantially equal, minimal differences may be observed for the 25 lp/mm values. The distortion and the relative illumination of the analyzed combination of standard lens module and close-up lens are slightly worse, but the values are still within acceptable limits and can be reduced to the additional lens.

Conveniently, the values of a close up lens which is de-centred by 0.5 mm along the movement direction of the assembly of lens 10, and covers 11 and 12 (x-axis) are of more interest. Additionally, the lens may be tilted of about 3° along the y-axis. In comparison with the obtained values of the combination standard lens module and close-up lens, the obtained values are practical the same within narrow limits.

The above presented tolerance analysis demonstrates that it is possible to design optical lenses to change optical properties of an lens module of a camera unit. Mechanical tolerances which have to be taken into consideration due to the mechanical support of the additional lenses placed in front of the lens module do not interfere with the quality of the pictures taken with the camera unit in combination with the additional lens. The design of suitable supports of the additional lenses, such as lens 10, is possible even in case of mounting the support of the lens to the housing which encloses the camera unit.

Camera modules may be built into a mobile phone or plugged to a mobile phone in kind of an extension module. In both cases the camera module has to be of small size and low weight according to the design of mobile terminal devices of state of the art and according to the market acceptance. Therefore, lens camera systems known from digital cameras may only be suitable in limited implementations. Especially, lens camera systems providing multiple optical imaging properties may be beyond the scope of the cost, size and weight specifications for usual utilization.

The following figures show possible embodiments of mobile phones equipped with camera units or modules according to the invention.

Figure 2A:
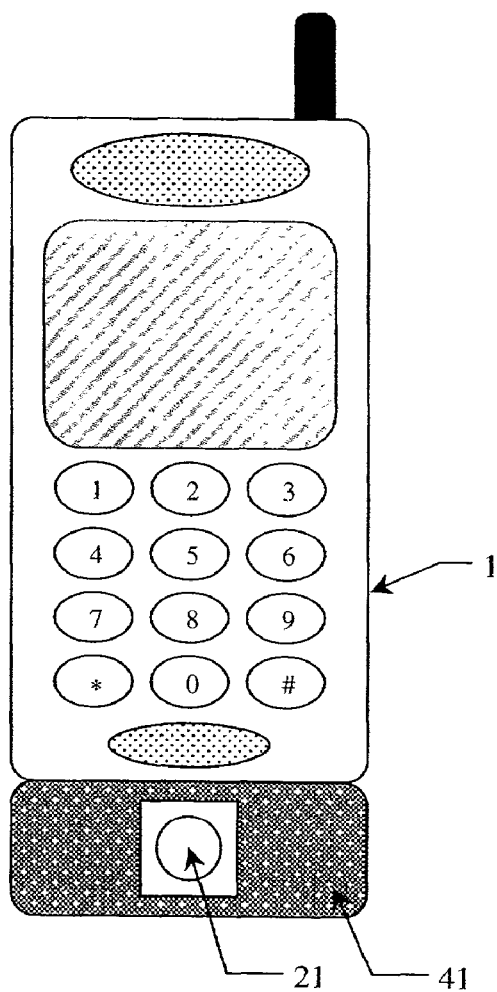
FIG. 2a shows a mobile phone equipped with a camera module according to a further embodiment of the invention.

FIG. 2a shows a mobile phone equipped with a camera module according to a further embodiment of the invention. A camera module 41 according to the invention may be provided as an external module which can be plugged to a mobile phone 1. The camera unit 21 including a lens module for standard imaging is permanently integrated into the camera module. The housing of the camera module 41 may comprise additional lenses, lens modules, filters or other mechanisms for changing optical properties of the built-in lens module of the camera unit.

Figure 2B:
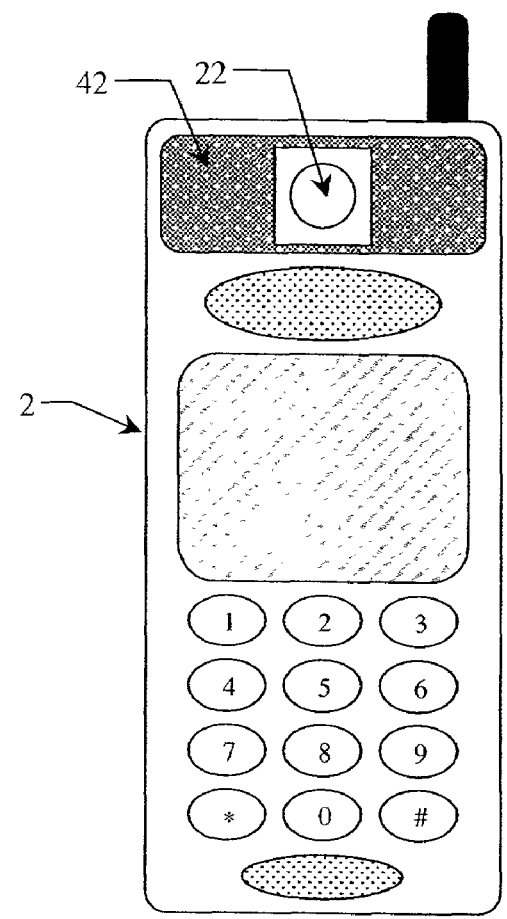
FIG. 2b shows a mobile phone with an integrated camera module with respect to a further embodiment of the invention.

FIG. 2b shows a mobile phone with an integrated camera module with respect to a further embodiment of the invention. A camera module 42 according to the invention may be provided as an internal module which can be plugged to a mobile phone 2. The camera unit 22 including a lens module for standard imaging is permanently integrated into the camera module. The housing of the camera module 42 may comprise additional lenses, lens modules, filters or other mechanisms for changing optical properties of the built-in lens module of the camera unit. The housing of camera module 42 may be also the housing of the mobile phone 2. Further, the housing of mobile phone 2 may be split into different parts, so that in case of replacing the additional mechanisms for changing optical properties of the camera unit 22 only the specific camera unit 22 enclosing part of the housing of the mobile phone may have to be replaced.

This kind of implementation of the camera unit may be advantageous for video telephony.

Figure 2C:
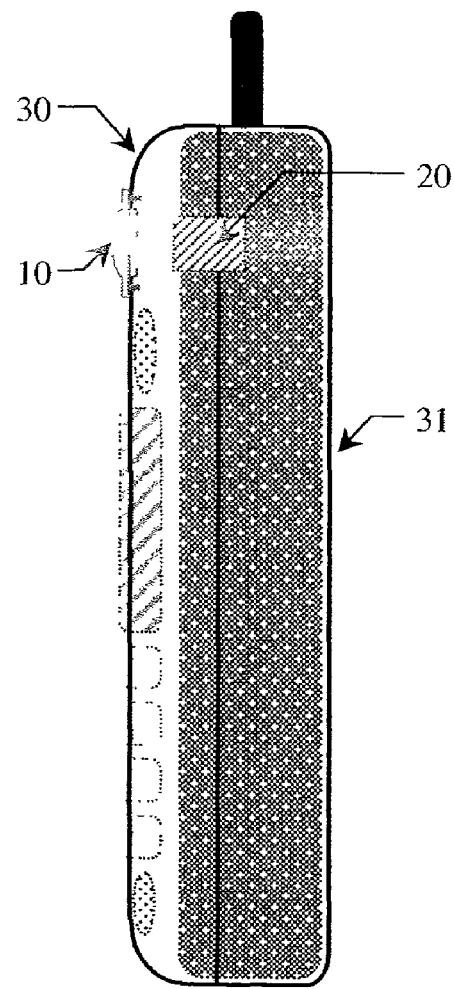
FIG. 2c shows a side view of a mobile phone with an integrated camera module according to FIG. 2b.

FIG. 2c shows a side view of a mobile phone integrating a camera module according to FIG. 2b. The housing of the mobile phone may consist of two parts, a front cover 30 and a back cover 31. The camera unit 20 is integrated in the mobile phone such that the front cover presents an optical pass through. Auxiliary lenses, filters or the like may be detachably connected to the front cover 30 which is shows by an optical mechanism 10. Moreover, the front cover 30 may be detachably connected to the back cover 31 of the mobile phone as to replace the whole front cover providing the possibility to permanently mount lenses, filters or other mechanisms to the front cover 30.

Figure 2D:
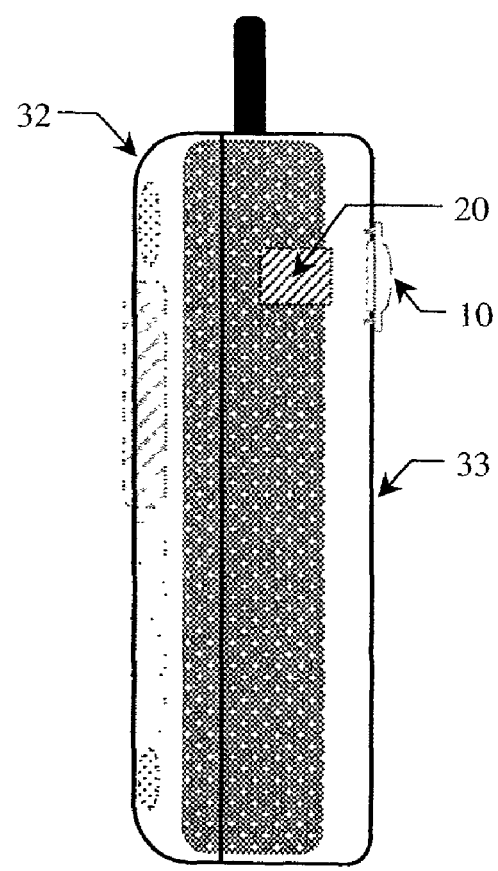
FIG. 2d shows a side view of a mobile phone with an integrated camera module with respect to a further embodiment of the invention.

FIG. 2d shows a side view of a mobile phone with an integrated camera module with respect to a further embodiment of the invention. In this embodiment the camera unit 20 is integrated in the mobile phone such that the back cover 33 presents an optical pass through for the camera unit 20. The housing of the mobile phone consists of two parts, the front cover 32 and the back cover 33. Optical means 10 are attached to the back cover 33 of the mobile phone according to the integration of the camera unit 20.

In summary, the presented embodiments of mobile phones combined with camera modules integrated or as external modules illustrates the basic aspect of the invention. A standard camera module is provided for the mobile phone which enables taking pictures using the camera unit comprising a standard optical lens module. The optical lens module provides a standard imaging. Further enhanced imaging involves the usage of additional optical means like auxiliary lenses, filters and the like. These optical mechanisms are attached to the housing of the camera module. In case of an external camera module, the module is enclosed by its own housing, in case of an integrated camera module, the housing encloses both the mobile phone and the integrated camera module. The optical mechanisms may be exchanged according to the demand for taking images. For example, the optical mechanism may be detachably connected to the respective housing or the housing or parts of the housing may be detachably connected. Moreover, several different optical mechanism may be mounted on the housing and be exchanged by suitable manual or automatic (motorized) actuation.

Different embodiments of covers comprising mechanisms for changing optical properties of the camera unit 20 will be given in the following figures.

FIG. 3a shows a side view of a cover with integrated detachably connected lens according to a further embodiment of the invention and FIG. 3b shows a back view of a cover with integrated detachably connected lens according to FIG. 3a. The part of the housing shown in FIG. 3a and FIG. 3b may be a part of the cover of a mobile phone, for example, the back cover or the front cover. The position of the camera unit comprising a lens module shall be indicated by element 20. The optical means 70 may be detachably connected to the cover 34. Hence, the optical mechanism may be easily exchanged by a user. Different fitting optical mechanisms 70 may be provided to the user to be connected to the cover 34 and adapted a the camera unit 20. A special connecting mechanism may be integrated in the cover 34 to enable the exchangeability of the optical mechanism 70. Certain snap-in elements provide the detachably connection to the cover 34 and ensure the correct placement. Further, the snap-in elements may ensure that only fitting and adapted optical mechanisms 70 may be connected to the cover 34.

Advanced optical elements which may be connected to the cover 34 may require electrical connections. These connections may be also provided by the snap-in elements or may be provided by an additional electrical connection 71 providing electrical connection between optical mechanism 70 and the electronics of the camera unit 20 indicated by reference numeral 71.

FIG. 4a shows a side view of a cover with integrated sliding arrangement of several lenses with respect to a further embodiment of the invention. FIG. 4b shows a back view of a cover with integrated sliding arrangement of several lenses with respect to FIG. 4a. The part of the housing shown in FIG. 4a and FIG. 4b may be a part of the cover of a mobile phone, e.g. the back cover or the front cover. The position of the camera unit comprising a lens module is indicated by element 20. Several optical mechanisms are arranged in an assembly 50. The assembly may comprise optical mechanisms like macro lenses, close-up lenses, far-distance lenses, filters and the like. These mechanisms may be adapted to the lens module of camera unit 20. Furthermore, the assembly may comprise a cover to protect the lens module of camera unit 20, for example a glass cover to be used for standard imaging or a protecting lightproof cover. The assembly may be moved by a sliding actuation which may be a manual actuation but also an automatic actuation, for example, a motorized sliding actuation. A suitable supporting guide may be integrated into the cover 35 and enables the sliding actuation of the assembly 50 by further mechanisms (not shown). The desired optical mechanisms 51, 52 or 53 may be placed in front of the lens module of camera unit 20 and changes the optical properties accordingly.

Additionally, the cover 35 integrating the assembly 50 may be detachably connected, such that a cover 34 which is shown in FIGS. 3*a* and 3*b* may be exchanged by a more comfortable cover 35.

FIG. 5*a* shows a side view of a cover with an integrated revolving arrangement of several lenses according to a further embodiment of the invention. FIG. 5*b* shows a back view of a cover with integrated revolving arrangement of several lenses according to FIG. 5*a*. The part of the housing shown in FIG. 4*a* and FIG. 4*b* may be a part of the cover of a mobile phone, phone example, the back cover or the front cover. The position of the camera unit comprising a lens module is indicated by element 20. Several optical mechanisms are arranged in an assembly 60. The assembly may comprise optics like macro lenses, close-up lenses, far-distance lenses, filters and the like. These optics may be adapted to the lens module of camera unit 20. Furthermore, the assembly may comprise also a cover to protect the lens module of camera unit 20. The optics may be integrated into a rotating wheel. The assembly may be moved by a revolving actuation which may be a manual actuation but also an automatic actuation, for example, a motorized sliding actuation. A suitable supporting guide may be integrated into the cover 36 and enables the revolving actuation of the assembly 60 by further mechanisms (not shown). The desired optics A, B, C, D or E of the assembly 60 may be placed in front of the lens module of camera unit 20 and change the optical properties accordingly.

Additionally, the cover 36 integrating the assembly 60 may be detachably connected, such that a cover 34 which is shown in FIGS. 5*a* and 5*b* may be exchanged by a more comfortable cover 36.

FIG. 6*a* shows a side view of a cover with integrated advanced optics with respect to a further embodiment of the invention. FIG. 6*b* shows a back view of a cover with integrated advanced optics with respect to FIG. 6*a*. The part of the housing shown in FIG. 4*a* and FIG. 4*b* may be a part of the cover of a mobile phone, for example, the back cover or the front cover. The position of the camera unit comprising a lens module shall be indicated by element 20. Advanced optics 80 may be mounted on the cover 37. The advanced optics may be a zoom optics, an auto-focus optics or the like. The advanced optics may be actuated manually or automatically (motorized). Therefore, it may be advantageous to provide electrical connection 81 for actuation and controlling of the advanced optics 80. The electrical connection 81 connects the advanced optics 80 to the electronics of the camera unit 20 or to the electronics of the mobile device (not shown). The camera unit 20 or the mobile device may provide controlling signals and power to the advanced optics, for example to focus on objects to be photographed. Particularly, in case of small objectives a motorized actuation of the objective functions like focus or zoom may be advantageous since manual actuation of small objective may be difficult due to small actuation device.

Preferably, the advanced optics may be mounted permanently to the cover 37 or may be detachably connected by a snap-in connector to the cover 37 like aforementioned in FIGS. 3*a* and 3*b*.

Additionally, the cover 37 integrating the advanced optics 80 may be detachably connected, such that a cover 34 which is shown in FIGS. 3*a* and 3*b* may be exchanged by a more comfortable cover 37 in case of a permanent mounting of the advanced optics.

Figure 7:
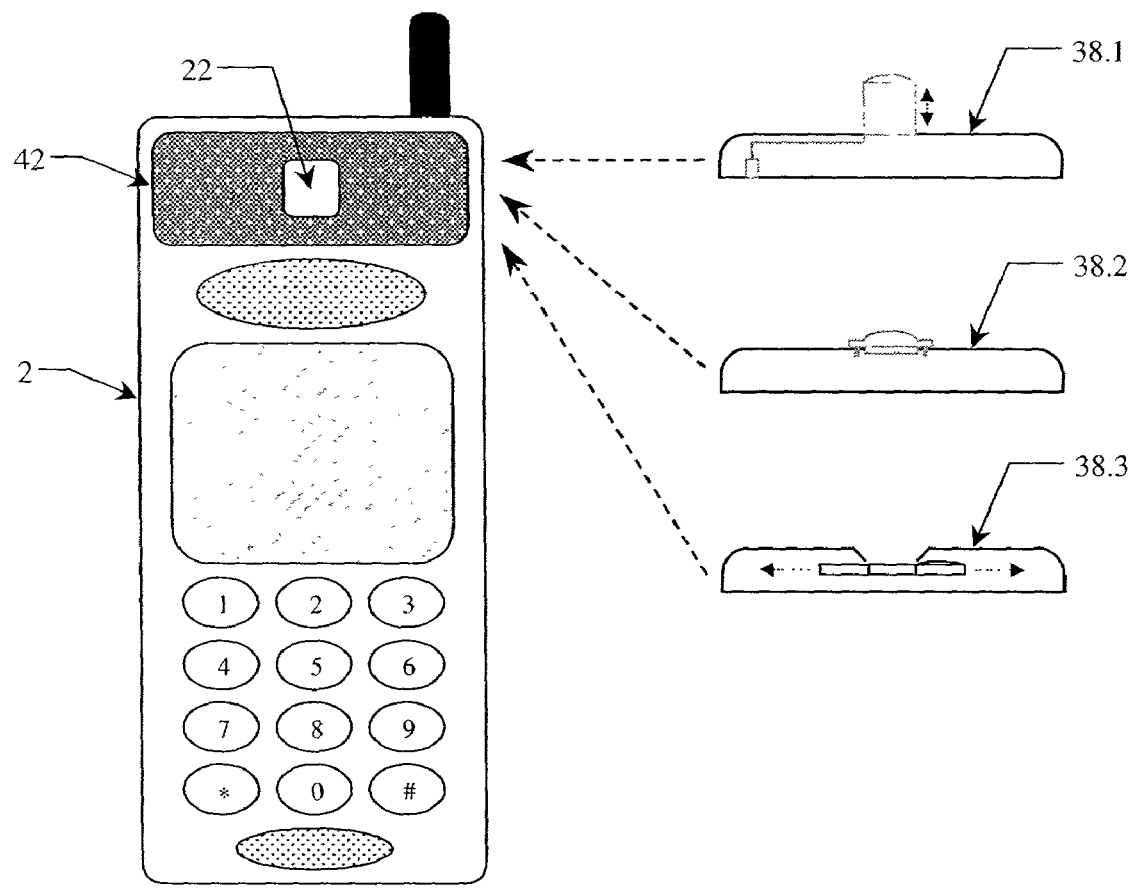
FIG. 7 shows a mobile phone comprising a camera module and different detachably connected cover parts according to a further embodiment of the invention.

FIG. 7 shows a mobile phone comprising a camera module and different detachably connected cover parts according to a further embodiment of the invention. The mobile phone 2 includes a camera module 42. The camera unit and the lens module for taking standard pictures according to the optical properties of the lens module may be indicated by reference numeral 22. The part of housing of the mobile phone 2 covering the camera module 42 may be detachably connected to the remaining part of housing of the mobile phone 2. Different suitable cover parts may be provided to be connected to the respective mobile phone 2. The standard cover part may be exchanged against one of the cover parts 38.1, 38.2 or 38.3. The following described cover parts and the optical mechanism comprised by the cover parts may be understood as exemplary and not limiting. Further cover parts and optical mechanism for changing optical properties of the lens module of camera unit 22 such as aforementioned may be provided additionally.

For example, the cover part 38.1 may comprise an advanced zoom objective which is actuated by a motor drive. Therefore, an additional electrical connection may be included in the cover part 38.1.

The cover part 38.2 may provide a snap-in element carrying a single lens, for example, a macro lens, close-up lens or a far-distance lens. These lenses may be adapted to the lens module of the camera unit 22 included in the camera module 42. Of course also other adapted optics, filters and other optics may be provided for the snap-in connector of cover part 38.2. The snap-in element of 38.2 provides a detachably connection of the mounted optics so that the optics may be exchanged fast and easily. It may be advantageous to provide further snap-in connectors for storing optics which are currently not in use. Such a storage may be provided on the back side of the mobile phone 2 but may be also included in the cover part 38.2. Additionally, an electrical connection for controlling signals and power supply, may be provided to connect the snap-in element and the electronics of the camera unit 22 or camera module 42 or the electronics of the mobile phone 2, respectively.

The cover part 38.3 may provide an assembly of optics adapted to the lens module for changing optical properties thereof. The assembly may integrate several optical elements and also a protective mechanism. Furthermore, the different optical mechanism may be placed in front of the lens module of the camera unit 20 by a sliding or a revolving actuation. The actuation may be a manual actuation or an automatically motor driven actuation.

Each cover part 38.1, 38.2 and 38.3 may be used in combination with the mobile phone including the camera module 42. According to the demands and requirements each user may select one or several of these optic enhancing cover parts. The user may be also able to select an optic enhancing cover part with respect of its size and weight. Each user may also be able to purchase more than one single optic enhancing cover part and exchange the cover parts according to the current demands to the photography situation. Detachably cover parts or the aforementioned snap-in connector give the users a high number of variations of the optical properties of the camera module whereas a high number of mobile phones integrate the same camera module which enables an overall cost efficiency of these mobile phones.

Although the present invention has been described in terms of the presently preferred embodiments, it is to be understood that such disclosure is not be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

The invention claimed is:

1. A mobile terminal device comprising:
a housing of the mobile terminal device comprising at least one telecommunications component and a camera system comprising a lens module which enables taking pictures with optical imaging properties given by the lens module; and
an optical properties changing unit slidably integrated with a part of the housing including functionality of moving to cooperate with the lens module of the camera system so as to enable taking pictures using the camera system with changed optical imaging properties, wherein the optical properties changing unit comprises a glass cover, a hard cover, and a lens different from the lens module of the camera system.

2. A mobile terminal device according to claim 1, wherein the optical properties changing unit is detachably connected to the camera system.

3. A mobile terminal device according to claim 1, wherein the housing comprises a detachable housing part; the detachable housing part comprises the optical properties changing unit and the optical properties changing unit comprises a plurality of different optical assemblies each being adapted to cooperate with the lens module of the camera system, wherein one of the plurality of different optical assemblies that cooperates with the lens module is changeable upon actuation.

4. A mobile terminal device according to claim 1, wherein the entire camera system is built-in the mobile terminal device.

5. A mobile terminal according to claim 1, wherein the mobile terminal device is a mobile phone.

6. A part of a housing of a mobile terminal device, which the mobile terminal device comprises at least one telecommunications component and a camera system, comprising:
an optical properties changing unit slidably integrated with the part of the housing including functionality of moving to cooperate with a lens module of the camera system, and to enable taking pictures with optical properties given by the lens module and the optical properties changing unit when the optical properties changing unit is cooperating with the lens module, and
wherein the optical properties changing unit comprises glass cover, a hard cover, and a lens different from the lens module of the camera system.

7. A part of the housing according to claim 6, wherein the optical properties changing unit is detachably connectable to the housing part.

8. A part of the housing according to claim 6, wherein the part of the housing is detachably connected to the lens module of the camera system.

9. A part of the housing according to claim 6, wherein the optical properties changing unit comprises a plurality of different optical assemblies integrated in the part of the housing, wherein an assembly is changeable upon actuation.

10. A part of the housing according to claim 6, wherein the mobile terminal device is a mobile phone.

11. An apparatus comprising:
an optical properties changing unit configured to be slidably integrated with a housing of a mobile terminal device that comprises:
a telecommunications component; and
a camera system comprising a lens module which enables taking pictures with optical imaging properties given by the lens module;
wherein the integrated optical properties changing unit includes functionality of moving to cooperate with the lens module of the camera system so as to enable taking pictures using the camera system with changed optical imaging properties, and
wherein the optical properties changing unit comprises a glass cover, a hard cover, and a lens different from the lens module of the camera system.

12. An apparatus for changing optical properties according to claim 11, wherein the part of the housing is detachably connectable with the camera system.

13. An apparatus for changing optical properties according to claim 11, wherein the mobile terminal device is a mobile phone.

14. A method comprising:
changing optical properties of a lens module of a camera system of a mobile terminal device being configured to enable taking pictures with optical properties given by the lens module by actuating an optical properties changing unit slidably integrated with a housing of the mobile terminal device having at least one telecommunications component to cooperate with the lens module so as to enable taking pictures with changed optical imaging properties;
wherein the optical properties changing unit comprises a glass cover, a hard cover, and a lens different from the lens module of the camera system.

15. A method for changing optical properties according to claim 14, wherein the camera system is built in the mobile terminal device.

16. A method for changing optical properties according to claim 14, wherein the mobile terminal device is a mobile phone.

17. An apparatus comprising:
a housing of a mobile terminal device comprising at least a telecommunications component and a camera system comprising lens module for taking pictures with optical imaging properties given by the lens module; and
an optical properties changing means slidably integrated with a part of the housing including functionality of moving to cooperate with the lens module of the camera system so as to enable taking pictures using the camera system with changed optical imaging properties, wherein the optical properties changing means comprises a glass cover, a hard cover, and a lens different from the lens module of the camera system.

18. A mobile terminal device according to claim 1, wherein the housing is a unitary housing configured to cover the entire mobile terminal device.

19. A part of the housing according to claim 6, wherein the housing is a unitary housing configured to cover the entire mobile terminal device.

20. An apparatus according to claim 11, wherein the housing is a unitary housing configured to cover the entire mobile terminal device.

21. A method according to claim 14, wherein the housing is a unitary housing configured to cover the entire mobile terminal device.

22. A mobile terminal device comprising:
a housing of the mobile terminal device comprising at least one telecommunications component and a camera system comprising a lens module which enables taking pictures with optical imaging properties given by the lens module; and an optical properties changing unit rotatably integrated with a part of the housing including functionality of moving to cooperate with the lens module of the camera system so as to enable taking pictures using the camera system with changed optical imaging properties, wherein the optical properties changing unit comprises a glass cover, a hard cover, and a lens different from the lens module of the camera system.

23. A mobile terminal device according to claim 22, wherein the optical properties changing unit is detachably connected to the camera system.

24. A mobile terminal device according to claim 22, wherein the housing comprises a detachable housing part; the detachable housing part comprises the optical properties changing unit and the optical properties changing unit comprises a plurality of different optical assemblies each being adapted to cooperate with the lens module of the camera system, wherein one of the plurality of different optical assemblies that cooperates with the lens module is changeable upon actuation.

25. A mobile terminal device according to claim 22, wherein the entire camera system is built-in the mobile terminal device.

26. A mobile terminal according to claim 22, wherein the mobile terminal device is a mobile phone.

27. A mobile terminal device according to claim 22, wherein the housing is a unitary housing configured to cover the entire mobile terminal device.

28. A part of a housing of a mobile terminal device, which the mobile terminal device comprises at least one telecommunications component and a camera system, comprising:

an optical properties changing unit rotatably integrated with the part of the housing including functionality of moving to cooperate with a lens module of the camera system, and to enable taking pictures with optical properties given by the lens module and the optical properties changing unit when the optical properties changing unit is cooperating with the lens module, and wherein the optical properties changing unit comprises a glass cover, a hard cover, and a lens different from the lens module of the camera system.

29. A part of the housing according to claim 28, wherein the optical properties changing unit is detachably connectable to the housing part.

30. A part of the housing according to claim 28, wherein the part of the housing is detachably connected to the optical properties changing means.

31. A part of the housing according to claim 28, wherein the optical properties changing unit comprises a plurality of different optical assemblies integrated in the part of the housing, wherein an assembly is changeable upon actuation.

32. A part of the housing according to claim 28, wherein the mobile terminal device is a mobile phone.

33. A part of the housing according to claim 28, wherein housing is a unitary housing configured to cover the entire mobile terminal device.

34. An apparatus comprising:
an optical properties changing unit configured to be rotatably integrated with a housing of a mobile terminal device that comprises:
a telecommunications component; and
a camera system comprising a lens module which enables taking pictures with optical imaging properties given by the lens module;
wherein the integrated optical properties changing unit includes functionality of moving to cooperate with the lens module of the camera system so as to enable taking pictures using the camera system with changed optical imaging properties, and
wherein the optical properties changing unit comprises a glass cover, a hard cover, and a lens different from the lens module of the camera system.

35. An apparatus for changing optical properties according to claim 34, wherein the part of the housing is detachably connectable with the camera system.

36. An apparatus for changing optical properties according to claim 34, wherein the mobile terminal device is a mobile phone.

37. An apparatus according to claim 34, wherein the housing is a unitary housing configured to cover the entire mobile terminal device.

38. An apparatus comprising:
a housing of a mobile terminal device comprising at least a telecommunications component and a camera system comprising lens module for taking pictures with optical imaging properties given by the lens module; and
an optical properties changing means rotatably integrated with a part of the housing including functionality of moving to cooperate with the lens module of the camera system so as to enable taking pictures using the camera system with changed optical imaging properties, wherein the optical properties changing means comprises a glass cover, a hard cover, and a lens different from the lens module of the camera system.

39. A method comprising:
changing optical properties of a lens module of a camera system of a mobile terminal device being configured to enable taking pictures with optical properties given by the lens module by actuating an optical properties changing unit rotatably integrated with a housing of the mobile terminal device having at least one telecommunications component to cooperate with the lens module so as to enable taking pictures with changed optical imaging properties; and
wherein the optical properties changing unit comprises a glass cover, a hard cover, and a lens different from the lens module of the camera system.

40. A method for changing optical properties according to claim 39, wherein the camera system is built in the mobile terminal device.

41. A method for changing optical properties according to claim 39, wherein the mobile terminal device is a mobile phone.

42. A method according to claim 39, wherein the housing is a unitary housing configured to cover the entire mobile terminal device.

* * * * *

UNITED STATES PATENT AND TRADEMARK OFFICE
CERTIFICATE OF CORRECTION

PATENT NO.        : 8,049,816 B2
APPLICATION NO.   : 09/987849
DATED             : November 1, 2011
INVENTOR(S)       : Jarkko Viinikanoja et al.

It is certified that error appears in the above-identified patent and that said Letters Patent is hereby corrected as shown below:

In Column 21, Claim 6, Line 49:
   Please replace "glass cover" with --a glass cover--

Signed and Sealed this
Sixth Day of March, 2012

David J. Kappos
*Director of the United States Patent and Trademark Office*

UNITED STATES PATENT AND TRADEMARK OFFICE
CERTIFICATE OF CORRECTION

PATENT NO. : 8,049,816 B2
APPLICATION NO. : 09/987849
DATED : November 1, 2011
INVENTOR(S) : Jarkko Viinikanoja et al.

It is certified that error appears in the above-identified patent and that said Letters Patent is hereby corrected as shown below:

In Column 24, Claim 38, Line 35:
Please replace "wherein the optical properties changing means" with --wherein the changing means--

Signed and Sealed this
Thirteenth Day of March, 2012

David J. Kappos
*Director of the United States Patent and Trademark Office*